Oct. 27, 1970    N. W. GITS ET AL    3,536,333
ROTARY SEALS
Filed March 18, 1968
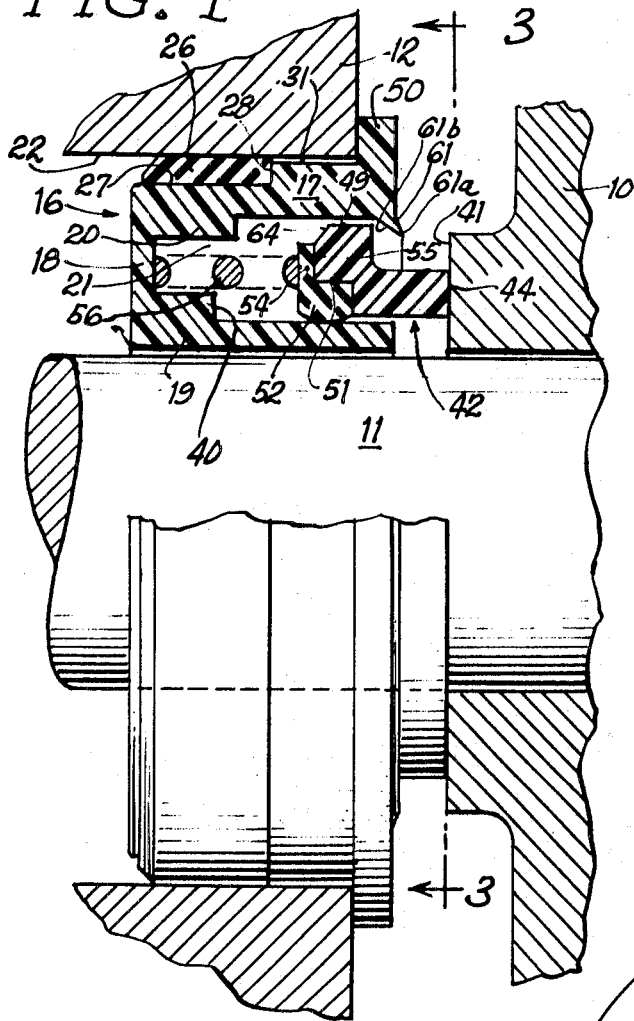
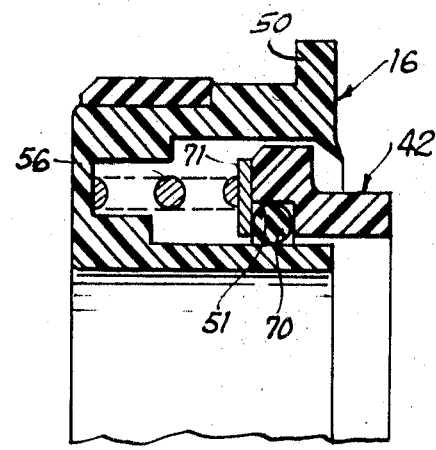
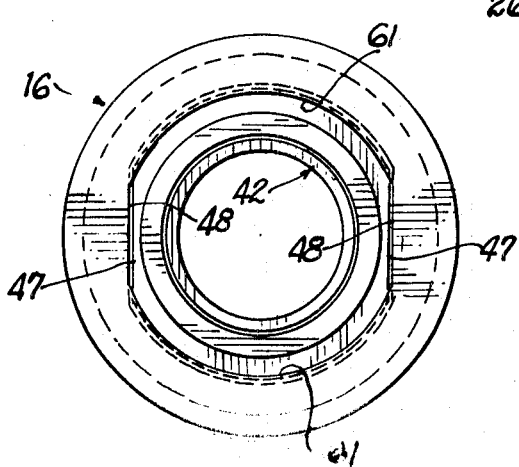
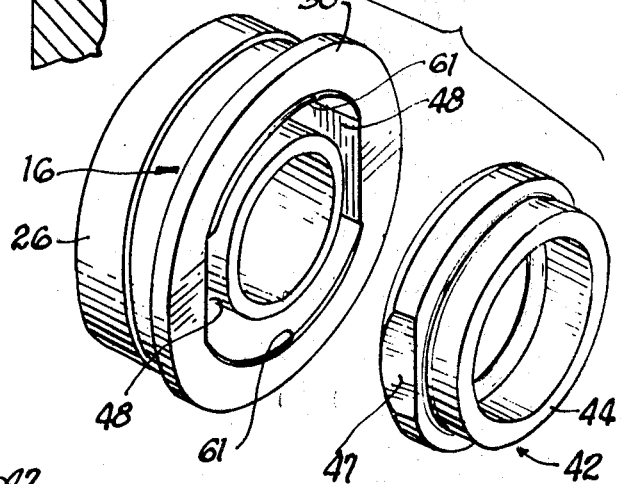
INVENTORS
Norbert W. Gits
Walter J. Taylor
By Leonard S. Knox
Atty

United States Patent Office 3,536,333
Patented Oct. 27, 1970

3,536,333
ROTARY SEALS
Norbert W. Gits, Indian Head Park, and Walter J. Taylor, Chicago, Ill., assignors to Pac-Seal, Inc., Chicago, Ill., a corporation of Illinois
Filed Mar. 18, 1968, Ser. No. 713,822
Int. Cl. F16j *15/34*
U.S. Cl. 277—37       10 Claims

ABSTRACT OF THE DISCLOSURE

A rotary seal such as is used for sealing the space between a rotatable shaft and the adjacent surface of a machine housing through which the shaft extends. The seal employs a casing which is secured to the housing and contains parts of the seal including a sealing ring which slides on a pad on the housing. In order to obtain a seal assembly which is unitary when sold and installed all of the parts are carried by, or retained with the casing. The sealing ring which, in turn, retains certain parts of the assembly, is held to the casing by having an annular flange engaged behind a flange of the casing. The casing, including its flange, is in one piece, desirably molded of a resilient, semi-rigid material capable of being momentarily deformed to allow insertion of the sealing ring with a snap fit, namely upon initial assembly, the sealing ring flange is forced past the casing flange while momentarily deforming the latter, so that thereafter the sealing ring is permanently retained in the assembly by the casing flange.

---

This invention relates to a rotary seal. More specifically it has relation to a seal which is self-contained whereby cost of manufacture, stocking, assembly and subsequent replacement are greatly facilitated.

A further object is to provide a casing carrying the several parts of the seal which has an outer diameter less than the diameter of the bore of the rotatable part in which the seal assembly is received, in order that the casing need not be press-fitted and whereby stress thereon is avoided. To close the space thus left between the bore and seal the latter carries an external resilient ring which is compressed between the bore and casing.

An additional object is to provide, between the sealing ring and a part of the casing surrounding the shaft, a novel form of packing ring via which the force of a compression spring is transmitted to the sealing ring to cause this latter to abut the pad of the machine housing whereat sliding occurs. This packing ring has a portion which, under the spring force, is squeezed to result in a more efficient seal between the casing and sealing ring.

In the drawing:

FIG. 1 is a combined side elevation and cross section showing one form of the invention seal in assembled relation with a typical environment;

FIG. 2 is a cross section, with parts broken away, of an alternative embodiment of the invention seal;

FIG. 3 is an end elevation taken on the line 3—3 of FIG. 1; and

FIG. 4 is an exploded view of the seal with the sealing ring disassociated therefrom and certain internal parts omitted.

Broadly regarded, the invention seal comprises a casing of resilient, but generally shape-retaining character having an inwardly-directed flange. The sealing ring, which has a working face having sliding engagement with a mating face on the machine housing, has an annular flange of diameter larger than the inner diameter of the flange of the casing. Since the casing is resilient the sealing ring may, upon initial assembly, be forced into position while momentarily deforming the casing outwardly by the interference between the two flanges. Thereafter the casing restores itself to retain the sealing ring in assembled condition. The space within the casing receives a compression spring positioned intermediate the casing and sealing ring to bias this latter into sealing abutment with the housing. A packing ring is located between the sealing ring and casing to preclude leakage between the same.

Devices embodying the principles of the invention are used not only to seal the interior of the machine housing e.g. of a pump or compressor, against entry of lubricant and foreign matter but to preclude exit of the gas or fluid past a shaft which extends outwardly of the housing. Accordingly, a typical environment would be as shown in FIG. 1, wherein the housing is indicated at 10, the shaft at 11 and a portion rotatable with the shaft, e.g. a pump impeller, at 12. A commercial form of seal is generally reversible, viz, the fixed part thereof may be received in a recess of the housing and the sliding contact made with a rotatable part within the housing.

In the example, the device comprises a one-piece shell-like casing 16 having an annular outer wall 17, an end wall 18 and an annular inner wall 19. These several walls define a space 21 which is open at the right. The wall 17 is made a slip fit in a bore 22 of the portion 12 of the machine, and centering and sealing in this region is obtained by means of a resilient ring 26, e.g. of rubber, seated in an annular recess 27, the end face 28 of which serves to locate the ring axially. As will appear subsequently, the casing 16 is desirably of plastic composition described as having an "elastic memory." Examples are Celcon, available from Celanese Corporation of America and Delrin, available from E. I. du Pont de Nemours & Co. In order to avoid the stress which may result from a press fit of the casing 16 into the bore 22 and consequent fracture, the clearance 31 is allowed. Since the casing 16 is a molded plastic part the wall 17 is desirably reinforced by means of an annular enlargement 20 or its equivalent, e.g. circumferentially spaced ribs. If desired, only the outer wall 17 may be made resilient. Wall 19 has running clearance with respect to the shaft 11.

The machine housing 10 is provided with a pad 41 against which a sealing ring 42 is pressed by bias means to be described. Accordingly, in operation, a face 44 of the ring will slide on the face 41, as will be understood by those in this art. The ring 42 may be of any material capable of long life under friction, e.g. graphited bronze or graphite in a suitable binder. The ring 42 is arranged to float in order that the surface 44 may accommodate itself to the surface 41 and, since the ring rotates with the seal assembly it is arranged to be driven thereby through a spline connection providing reasonable play to allow floating action, e.g. by a pair of opposite flats 47—47 mating with complementary flats 48—48 formed within the casing 16 (FIGS. 3 and 4). Referring to FIG. 3, clearance for floating action is shown by the spacing between the pairs of flats 47 and 48, and by the broken lines, which latter represent the clearance 49 in FIG. 1.

The sealing ring 42 has an annular recess 51 to receive a preferred form of packing ring 52, forming a reasonably snug fit over the wall 19, the surface of this ring having essentially a line contact, e.g. curved, to facilitate radial deformation, and thus seal against leakage which may otherwise occur past this packing ring. This ring has a radially-extending flange 54 contiguous to the rear face 55 of the sealing ring 42. A compression spring 56 is interposed between the rear face of the packing ring 52 and the end wall 18 to bias the surface 44 of the sealing ring 42 into running contact with the surface 41. This spring is centered by means of an annular boss 40, over which it is received with a reasonably close fit. Moreover the force of the spring will deform the ring 52 to implement the sealing action thereof with respect to the wall 19.

The casing 16 has a radially-extending flange 50 to abut the right-hand face of the part 12 whereby to locate the seal assembly in its axial position. The casing 16 is also provided with an inwardly-directed flange 61 which extends peripherally of the interior of the wall 17 except where interrupted by the flats 48—48 (FIGS. 3 and 4). As pointed out above, the casing is of some semi-rigid composition, e.g. molded plastic, which is resilient but yet shape-retaining. Accordingly the male portion of the mold in which the casing is fabricated may be withdrawn without difficulty, as will be understood. The flanges 61 may have various transverse cross sections but is desirably as shown, and has an inner diameter less than the outer diameter of the ring 42. The ring 42 has an enlarged inner end, i.e. a flange, which is chamfered at 64 to provide lead. Accordingly, upon initial assembly of the device the spring 56 is located as shown, and then the ring 42 with its therewith-assembled packing 52 is forced past the flange 61 into the position of FIG. 1. During this step the interference between the ring 42 and flange 61 will deform the casing 16 sufficiently to permit passage of the ring 42 therewithin, whereupon the casing will restore itself to retain the ring and spring as parts of the unitary assembly.

It will be understood that the spring bias is insufficient to dislodge the sealing ring 42 from behind the flange 61. The outer inclined face 61a of the flange 61 assists in centering chamfer 64 during assembly, whereas the rear face 61b will facilitate disassembly if this may be required in the shop or in the field. For example, the packing 52 may require replacement.

A modified embodiment is illustrated in FIG. 2 wherein a conventional O-ring 70 replaces the packing ring 52. In this case a washer 71 is employed as a bearing face for the spring 56. Alternatively the O-ring may be received in a groove and the washer eliminated. However, it has been found that, when using an O-ring the recess 51 must be held to closer tolerances than may be commercially available for parts which are molded or pressed out of sintered materials.

From the foregoing it will have become apparent that the seal of the invention is extremely simple, comprising a relatively few parts of simple construction, all of which, except the spring of FIG. 1, lend themselves to fabrication by molding and, in the case of FIG. 2, the possible use of the washer 71. By reason thereof low cost is achieved without any sacrifice in efficiency, reliability and useful life.

What is claimed is:

1. In a rotary seal to be interposed between a fixed part and a part rotatable relative thereto, the rotatable part having a bore, and the fixed part having a pad, the improvement which comprises: a one-piece casing, said casing comprising a hollow cylindrical outer wall, a hollow cylindrical inner wall and an end wall intermediate the cylindrical walls to define a space between said walls, said space being open at one end, the outer diameter of said outer wall being adapted to be received in the bore and the inner diameter of said inner wall being adapted to fit around said rotary part with running clearance, said casing comprising material which is resilient but generally shape-retaining so as to return to a normal condition following momentary deformation, said outer wall having a radially-inwardly extending flange of some predetermined internal radius, a sealing ring assembled with said casing, said sealing ring having a surface adapted for sliding contact with the pad and a portion having an outer radius greater than said flange radius in the normal condition of the flange, one of said sealing ring portion and said flange being so shaped that said portion, upon being forced axially into engagement with said flange, will cause momentary deformation of said casing outer wall and snap past said flange into said space, said outer wall reverting to its normal condition after said portion has passed said flange to retain said portion within said space, means intermediate said casing and sealing ring biasing said sealing ring surface into said sliding contact, one of the sides of said flange facing said space and the side of said portion facing outwardly of said space being so shaped that, said portion, upon being forced axially outwardly from said space will cause momentary deformation of said casing outer wall and snap past said flange out of said space, the force of said means biasing said sealing ring surface into said sliding contact being normally insufficient to cause said deformation, and spline means between said casing and sealing ring restraining the ring from rotation relative thereto while permitting axial freedom thereof.

2. The combination in accordance with claim 1 further characterized by packing means intermediate said sealing ring and casing inner wall.

3. The combination in accordance with claim 1 further characterized in that the outer diameter of the casing outer wall is less than the diameter of the bore to provide clearance therebetween.

4. The combination in accordance with claim 1 further characterized in that the entering end of said sealing ring portion is chamfered to facilitate passage thereof past the casing flange.

5. The combination in accordance with claim 1 wherein said casing flange has an inner face which is inclined toward its axis and outwardly of the casing to provide a frusto-conical surface facilitating displacement of said flange upon disassembly of said sealing ring.

6. The combination in accordance with claim 1 wherein said casing flange has an outer face which is inclined toward its axis and outwardly of the casing to provide a frusto-conical surface engageable by the inner end of the sealing ring to center said ring when the same is forced into assembled position.

7. The combination in accordance with claim 1 further characterized in that the sealing ring has a radially disposed inner end face provided with a recess opening on the inner end face of the ring, and packing means, said packing means being essentially of L-shape, the foot thereof being received in said recess and the leg thereof abutting said inner end face, said biasing means bearing on said leg whereby the force of the biasing means compresses the foot portion of the packing means into sealing relation with the casing inner wall.

8. The combination in accordance with claim 1 wherein said spline means is constituted by at least one flat on the casing and a complementary flat on said sealing ring.

9. The combination in accordance with claim 8 wherein said flats have clearance therebetween to allow float of the sealing ring.

10. The combination in accordance with claim 8 wherein in said casing flat interrupts said casing flange.

References Cited

UNITED STATES PATENTS 2,593,899   4/1952   Krug _____ 277—40

(Other references on following page)

UNITED STATES PATENTS

| | | | |
|---|---|---|---|
| 2,856,219 | 10/1958 | Kosatka | 277—38 |
| 3,020,056 | 2/1962 | Agens | 277—87 X |
| 3,162,136 | 12/1964 | Clary et al. | 277—40 X |
| 2,806,720 | 9/1957 | Meyer | 277—37 |
| 3,047,298 | 7/1962 | St. Clair et al. | 277—37 X |

FOREIGN PATENTS

| | | |
|---|---|---|
| 941,110 | 4/1956 | Germany. |
| 773,663 | 5/1957 | Great Britain. |
| 886,045 | 1/1962 | Great Britain. |
| 946,534 | 1/1964 | Great Britain. |

OTHER REFERENCES 1,103,093, March 1961. German Publication—Goetze.

JAMES KEE CHI, Primary Examiner

U.S. Cl. X.R.

277—38, 40, 87